T. H. WALBRIDGE.
WHEEL.
APPLICATION FILED OCT. 29, 1906. RENEWED JUNE 2, 1908.
911,926.
Patented Feb. 9, 1909.
6 SHEETS—SHEET 1.
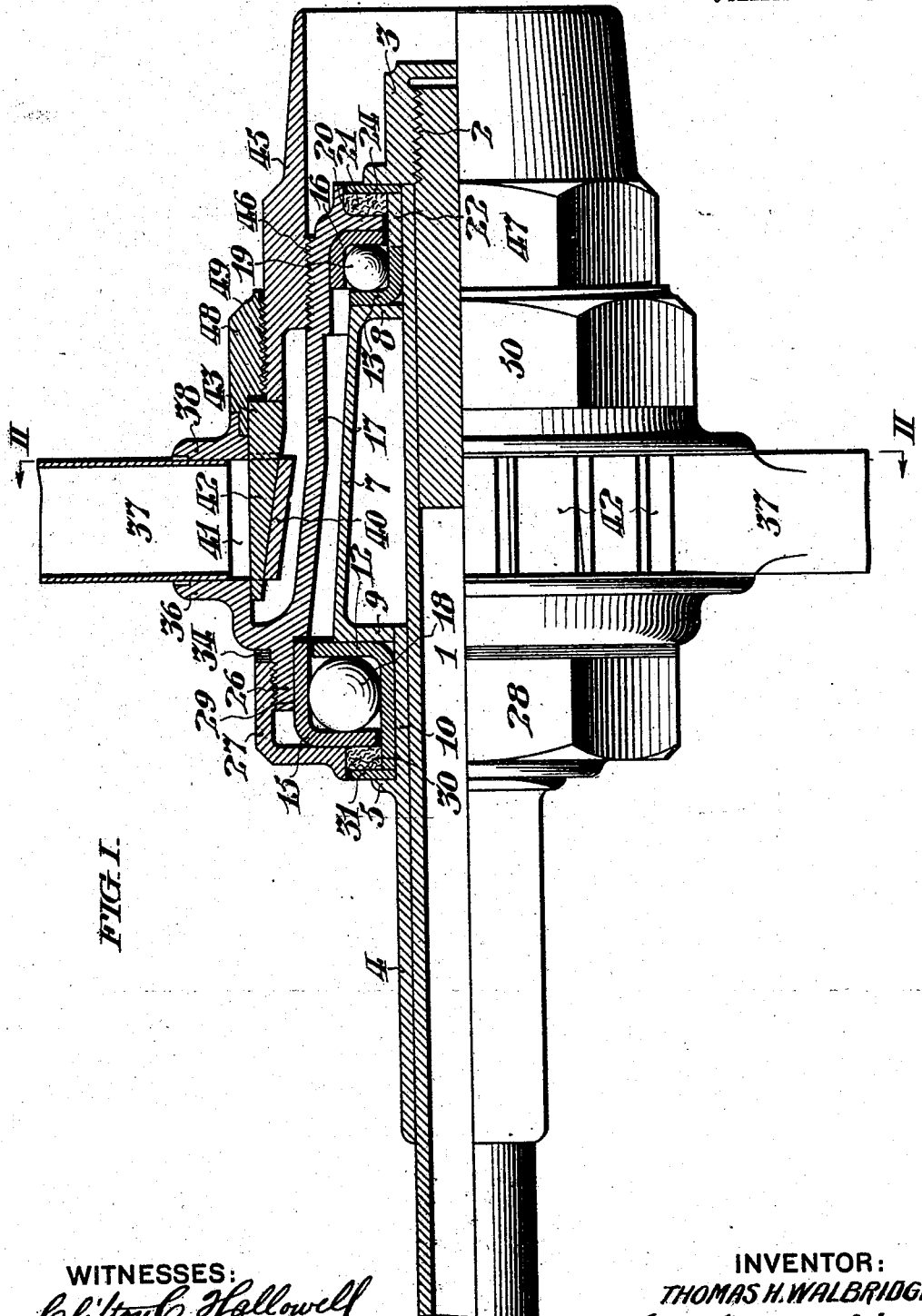
FIG. I.
WITNESSES:
INVENTOR:
THOMAS H. WALBRIDGE, T. H. WALBRIDGE.
WHEEL.
APPLICATION FILED OCT. 29, 1906. RENEWED JUNE 2, 1908.
911,926.
Patented Feb. 9, 1909.
6 SHEETS—SHEET 2.
FIG. II.
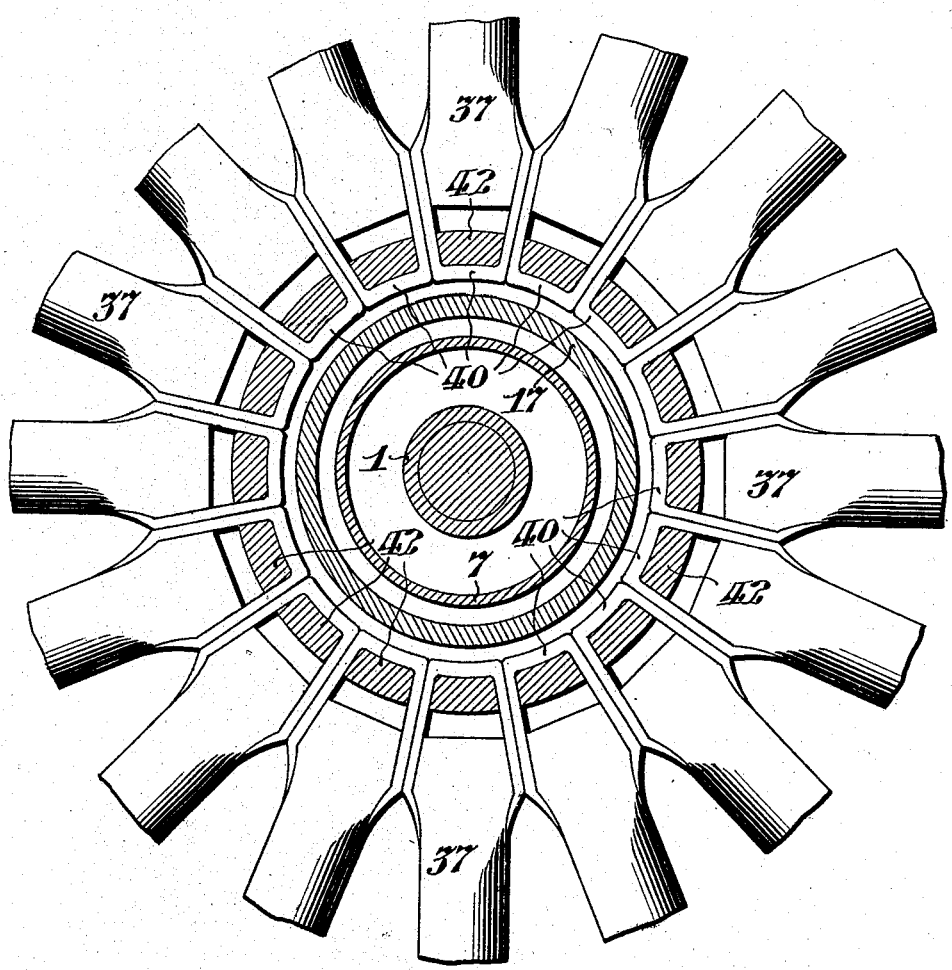
FIG. III.
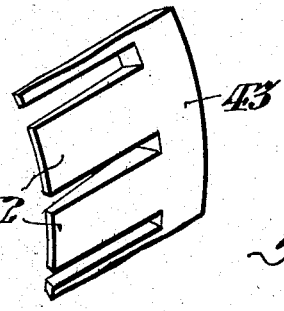
WITNESSES:
INVENTOR:
THOMAS H. WALBRIDGE, T. H. WALBRIDGE.
WHEEL.
APPLICATION FILED OCT. 29, 1906. RENEWED JUNE 2, 1908.
911,926.
Patented Feb. 9, 1909.
6 SHEETS—SHEET 3.
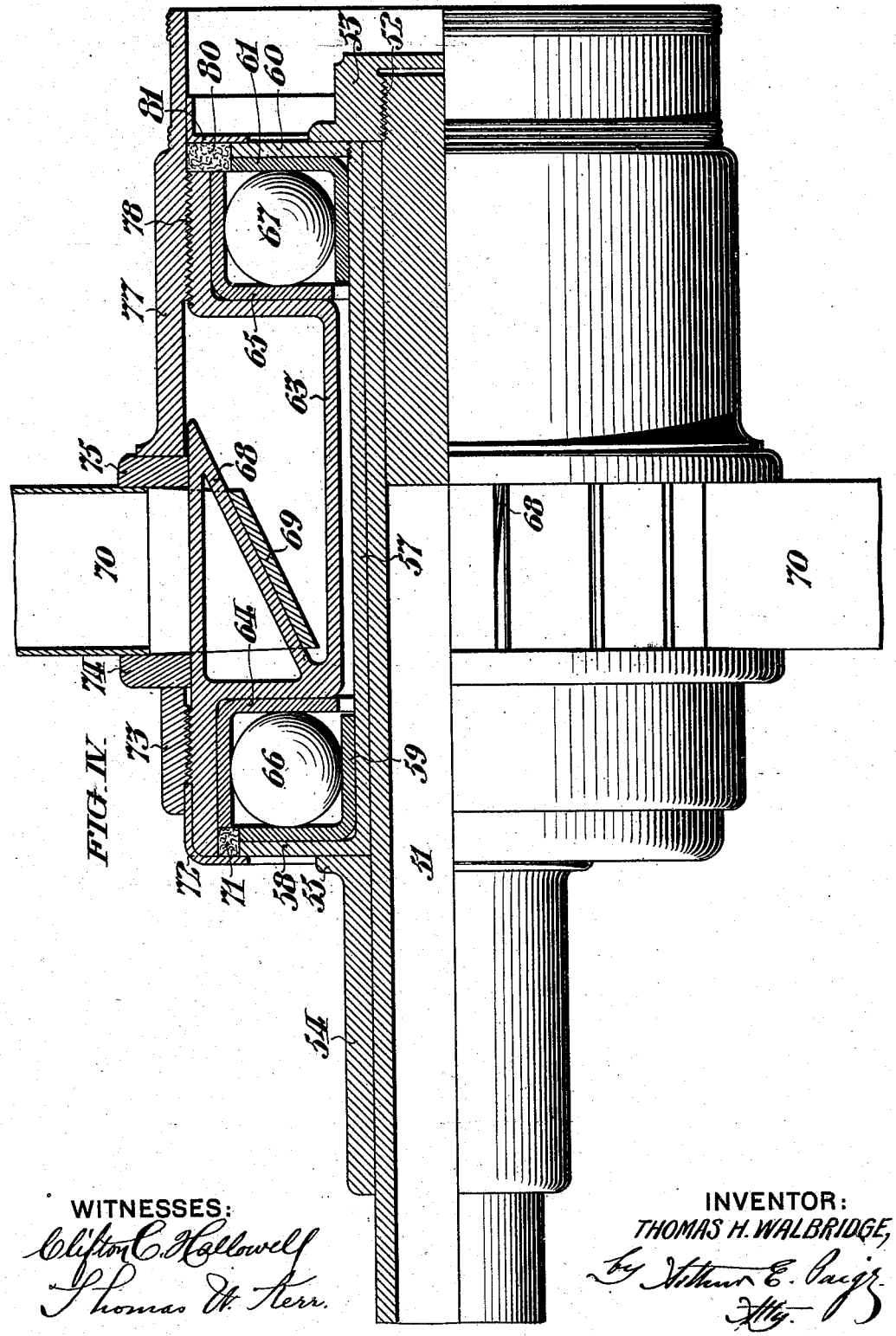
WITNESSES:
INVENTOR:
THOMAS H. WALBRIDGE,

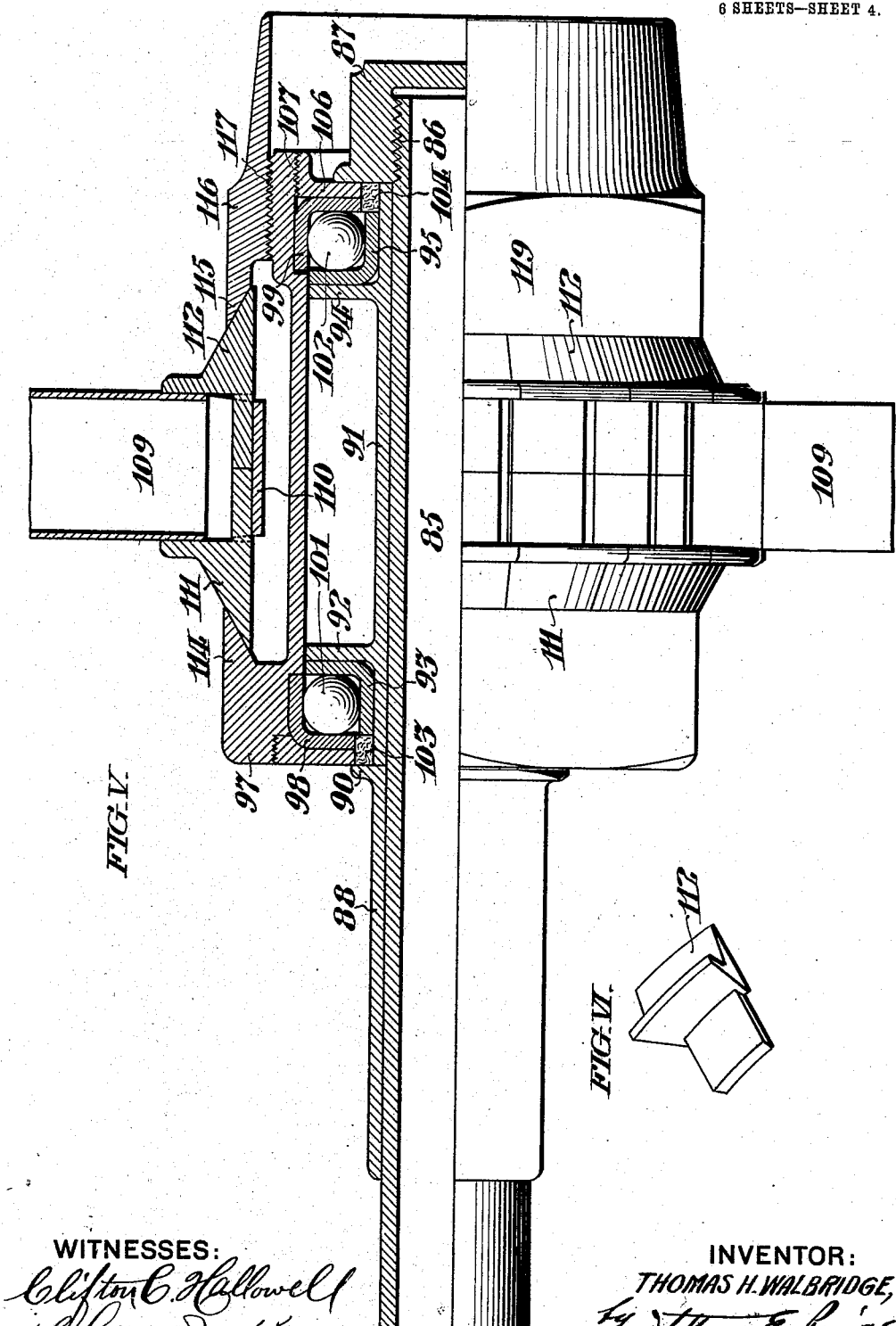

T. H. WALBRIDGE.
WHEEL.
APPLICATION FILED OCT. 29, 1906. RENEWED JUNE 2, 1908.
911,926.
Patented Feb. 9, 1909.
6 SHEETS—SHEET 5.
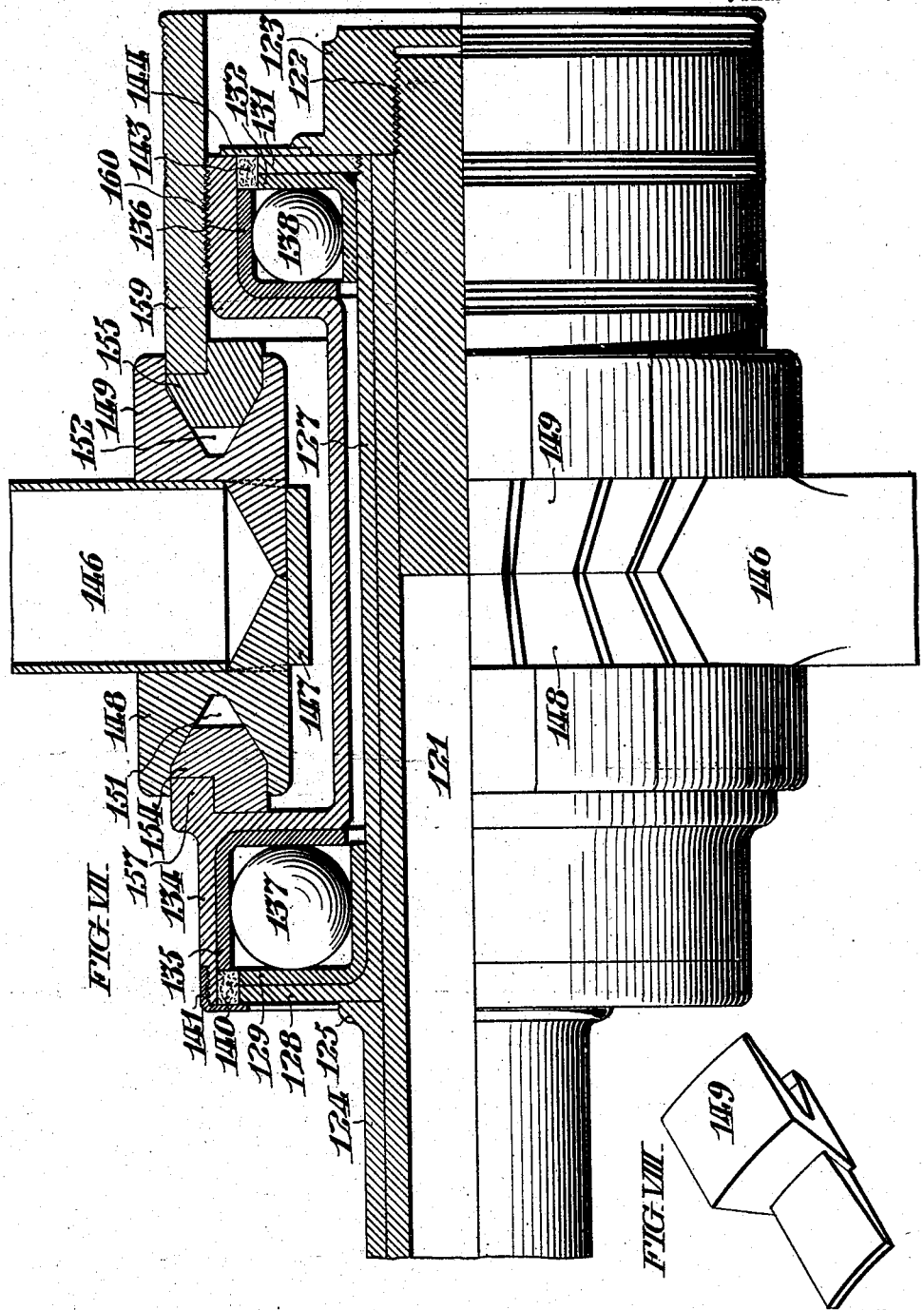
WITNESSES:
INVENTOR:
THOMAS H. WALBRIDGE, T. H. WALBRIDGE.
WHEEL.
APPLICATION FILED OCT. 29, 1906. RENEWED JUNE 2, 1908.
911,926.
Patented Feb. 9, 1909.
6 SHEETS—SHEET 6.
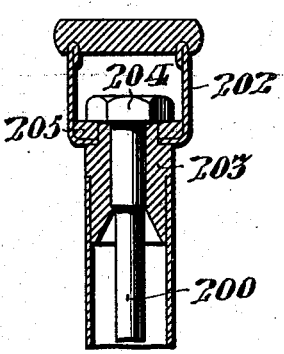
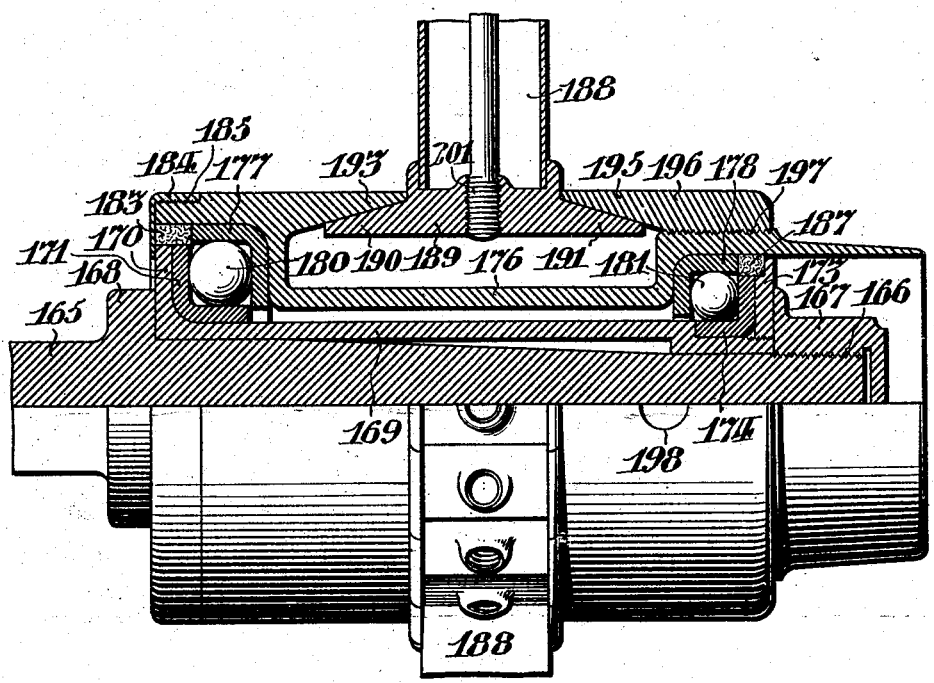
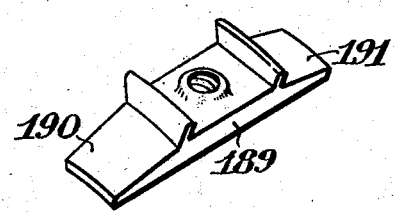
WITNESSES:
INVENTOR:
THOMAS H. WALBRIDGE,

UNITED STATES PATENT OFFICE.

THOMAS H. WALBRIDGE, OF TOLEDO, OHIO.

WHEEL.

No. 911,926.  Specification of Letters Patent.  Patented Feb. 9, 1909.

Application filed October 29, 1906, Serial No. 340,974. Renewed June 2, 1908. Serial No. 436,225.

*To all whom it may concern:*

Be it known that I, THOMAS H. WALBRIDGE, of Toledo, Ohio, have invented a certain new and useful Improvement in Wheels, whereof the following is a specification, reference being had to the accompanying drawings.

As hereinafter described, my invention comprises a wheel hub consisting of opposed complementary sections arranged to detachably engage spokes arranged in a circumferential series, and wedging means in said hub arranged to individually draw said spokes radially inward, the arrangement being such that the felly and hub are connected under tension by the spokes, the degree of tension being determined by the wedging means aforesaid.

My invention comprises the various novel features of construction and arrangement hereinafter more definitely specified.

In said drawings, Figure I, is a fragmentary diametrical sectional view of a wheel hub, embodying my improvement, the lower half of the hub being shown in elevation. Fig. II, is a sectional view taken on the line II, II, in Fig. I. Fig. III, is a fragmentary perspective view of the wedge ring shown in section in Fig. I. Fig. IV, is a view similar to Fig. I, but showing a modified form of my invention. Fig. V, is a view similar to Fig. I, but showing a modified form of my invention. Fig. VI, is a perspective view of one of the wedges shown in section in Fig. V. Fig. VII, is a view similar to Fig. I, but showing a modified form of my invention. Fig. VIII, is a perspective view of one of the wedges shown in section in Fig. VII. Fig. IX, is a view similar to Fig. I, but showing a modified form of my invention in connection with a felly. Fig. X, is a perspective view of one of the wedges shown in section in Fig. IX.

Referring to the form of my invention shown in Figs. I, II, and III; the axle 1, has the screw thread 2, at its outer end for engagement with the nut 3, and is provided with the sleeve 4, having the abutment flange 5, extending transversely with respect thereto to determine the location of the wheel thereon. The skein 7, has its outer end 8, fitted directly upon the axle, and its inner end 9, fitted upon the outer portion 10, of the sleeve 4, said sleeve being of circular cross section within the wheel hub, but being rectangular throughout its portion extending inwardly from said flange 5, in order to form a seat for the spring connection between the axle and the vehicle. Said skein 7, maintains the ball bearing rings 12 and 13, separated a predetermined distance, but is movable axially with said rings to permit the adjustment of the ball bearings, comprising said rings 12 and 13, the rings 15 and 16 which are respectively opposed to them in the axle box 17, and, the two series of balls 18 and 19, which are mounted between them. The outer end of said axle box 17, is provided with the recess 20, for the dust ring 21, which may be conveniently formed of felt or similar material encircling the loose collar 22, which abuts against the ball ring 13, on the axle 1. Said dust ring 21, is retained in position by the washer 24, supported by the nut 3. The inner end of the axle box 17, is provided with the screw threaded flange 26, engaged by the ball bearing adjusting cap 27, having the wrench hold 28, whereby the ball race 15, may be shifted axially in its recess 29 in said box 17. The joint between said rings 12 and 15 is covered by the dust ring 30, which is retained in position by the washer 31, supported by the flange 5. The space between the inner edge of said cap 27, and box 17, may be filled with washers 34 as indicated in Fig. I. Said box 17, comprises the flange 36 in rigid relation therewith, engaging the inner ends of the spokes 37, the opposite sides of said spokes being engaged by the loose clamp ring 38. The inner ends of said spokes 37, are respectively provided with the hasps 40, which, as shown in Fig. II, are bights of sheet metal secured in rigid relation with the ends of the spokes and comprising recesses 41, in which individual wedges 42 are fitted as indicated in Fig. I. As shown in Fig. III, said wedges 42 are carried by the thrust ring 43, being conveniently formed in unitary relation therewith. Said wedges 42 are axially adjusted to tensely strain the spokes 37, in the hub, by rotation of the thrust sleeve 45, which has screw threads 46, engaging the box 17, and a wrench hold 47, exterior to the hub. When said spokes 37 have been properly adjusted so as to be strained inwardly with respect to the hub, by rotation of the thrust sleeve 45, they may be clamped between the stationary flange 36, and the loose clamp ring 38, by rotation of the clamping nut 48, which has screw threads 49, engaging said thrust sleeve 45 and is provided with the wrench hold 50, exterior to the hub.

Referring to the form of my invention shown in Fig. IV; the axle 51, has the screw thread 52, for the nut 53 and is provided with the sleeve 54 having the flange 55 which forms an abutment determining the position of the wheel on the axle. Said axle 51 is provided with the skein 57, having the flange 58 at its inner end, in contact with said flange 55, retaining the ball bearing ring 59, and, said skein has the removable screw threaded flange 60, at its outer end retaining the ball bearing ring 61, and supported by the nut 53. The axle box 63, carries the ball bearing rings 64 and 65, respectively opposed to the rings 59 and 61 and provided with the two series of balls 66 and 67. The individual wedges 68, which are fitted in the hasps 69, of the respective spokes 70, are directly supported by said box 63, and preferably in unitary relation therewith as indicated. The joint between the ball bearing rings 59 and 64, is sealed by the dust ring 71 which is retained by the flange 72 on the screw threaded collar 73, which latter supports the loose clamp ring 74, engaging the inner ends of the spokes 70. Said spokes 70, are engaged, upon the opposite side, by the loose clamp ring 75 and may be adjusted axially with respect to the wedges 68, so as to tensely strain them inwardly with respect to the hub, by rotation of the thrust sleeve 77, which has the screw thread 78 engaged with the box 63. The joint between the ball bearing rings 61 and 65 is sealed by the dust ring 80, which is retained by the flange 81, carried by said thrust sleeve 77.

Referring to the form of my invention shown in Figs. V and VI; the axle 85, has the screw thread 86, for the nut 87, and is provided with a sleeve 88 having the flange 90, which forms an abutment determining the position of the wheel on the axle. Said axle 85, is provided with a skein 91, having the flange 92, at its inner end supporting the ball bearing ring 93, and, said skein has the flange 94, at its outer end supporting the ball bearing ring 95. The axle box 97, carries the ball bearing rings 98 and 99, respectively opposed to the rings 93 and 95, and provided with the two series of balls 101 and 102. The joint between the bearing rings 93 and 98, is sealed by the dust guard ring 103 which is retained by the flange 90, and, the joint between the bearing rings 95 and 99 is sealed by the dust guard ring 104, which is retained by the nut 87. Said bearings are adjustable by the ring 106, which supports the ring 99, and is provided with a screw thread 107, in engagement with the box 97. The spokes 109, are provided with hasps 110, at their inner ends which support removable hasp members 111 and 112, which are wedge shaped and project transversely with respect to the spokes. Said hasp members 111 are engaged within the annular wedge shaped flange 114, which is in rigid relation with the axle box 97, and the hasp members 112 are engaged within the annular wedge shaped flange 115 on the thrust sleeve 116, which latter is provided with a screw thread 117, engaged with the axle box 97. Said thrust sleeve 116, being provided with the wrench hold 119, exterior to the hub, may be rotated with respect to the latter so as to tensely strain the spokes 109, inwardly with respect to the hub.

Referring to the form of my invention shown in Figs. VII and VIII; the axle 121, has the screw thread 122 for the nut 123, and is provided with a sleeve 124, having the flange 125, which forms an abutment determining the position of the wheel on the axle. Said axle 121, is provided with a skein 127, having the flange 128, at its inner end supported by the flange 125, and retaining the ball bearing ring 129. Said skein 127 has the removable screw threaded flange 131, at its outer end retaining the ball bearing ring 132, and supported by the nut 123. The axle box 134, carries the ball bearing rings 135 and 136, respectively opposed to the rings 129 and 132, and provided with the two series of balls 137 and 138. The joint between the ball bearing rings 129 and 135, is sealed by the dust guard ring 140, which is retained by the ring 141, in screw threaded engagement with the axle box 134. The joint between the ball bearing rings 132 and 136, is sealed by the dust guard ring 143, which is retained by the washer 144, supported by the nut 123. The spokes 146, are provided with hasps 147 at their inner ends which support removable hasp members 148 and 149 which project transversely with respect to the spokes, and are provided with wedge shaped recesses 151 and 152 respectively fitted to the annular wedges 154 and 155. Said annular wedge 154, is supported by the flange 157, on the axle box 134. Said annular wedge 155, is supported and arranged to be adjusted by the thrust sleeve 159, which has the screw thread 160 in engagement with the axle box 134.

Referring to the form of my invention shown in Figs. IX and X, the axle 165, has the screw thread 166, for the nut 167 and is provided with the flange 168, which forms an abutment determining the position of the wheel on the axle. Said axle 165 is provided with the skein 169, having the flange 170, at its inner end in contact with said flange 168, and retaining the ball bearing ring 171. Said skein 169, has the removable screw threaded flange 173, at its outer end, retaining the ball bearing ring 174 and supported by the nut 167. The axle box 176, carries the ball bearing rings 177 and 178 respectively opposed to the rings 171 and 174, and provided with the two series of balls 180 and 181. The joint between the two bearing rings 171 and 177 is sealed by the dust guard ring 183 which is retained by the ring 184 having the screw thread 185 in engagement with the box 176, and, the joint between the bearing rings 174 and 178 is sealed by the dust guard ring 187 which is retained by the flange 173. The spokes 188 are provided with the hasps 189 comprising the wedge shaped ledges 190 and 191, extending oppositely therefrom beyond the perimeter of the spoke and in alinement with the axis of the wheel. Said hasp members 190 are engaged within the annular wedge shaped flange 193 which is in rigid relation with the axle box 176, and, the hasp members 191, are engaged within the annular wedge shaped flange 195, on the thrust sleeve 196, which latter is provided with the screw thread 197, engaged with the axle box 176. Said thrust sleeve 196 being provided with the wrench hold 198 exterior to the hub, may be rotated with respect to the latter so as to tensely strain the spokes 188, inwardly with respect to the hub. Said hasps 189 may be secured to the inner ends of the spokes 188 by any convenient means, but I prefer to secure them by providing each of the spokes with a rod 200, having a screw thread 201 at its inner end engaged with its hasp 189, and having means at its outer end for connecting the spoke with the felly 202. As shown in Fig. IX, the outer end of the spoke 188 is provided with the bushing 203, through which the rod 200 extends, and said rod is provided with the head 204, which overlaps the felly member 205 and rigidly connects the felly with the spoke.

Although the wrench holds upon the exterior of the hub may be conveniently made polygonal or indented as above described, it is to be understood that a wrench hold for a spanner wrench of the friction type may be afforded by a smooth cylindrical surface.

In all of the forms of my invention above described, the spokes are provided with distinct means at their inner ends whereby they may be engaged, drawn inwardly with respect to the hub, and tensely strained between the hub and the felly, and, I have used the word hasp as comprehensive of any loop or hook structure of the character contemplated, carried by the inner ends of the spokes, whereby they may be engaged and strained as described. Moreover, it may be observed that the wedge shaped members which extend transversely with respect to the spokes at the inner ends thereof have bearings in the hub at each end of said members, supporting them in opposition to the tensile strain thereon.

I do not desire to limit myself to the precise details of construction and arrangement herein described, as it is obvious that various modifications may be made therein without departing from the scope of the following claims.

I claim:—

1. In a wheel, the combination with a hub, of spokes having wedge engaging hasps at their inner ends; of wedging means in said hub arranged to engage the inner ends of the spokes and draw them toward the wheel axis, comprising distinct individual wedges respectively engaging said hasps; and, a thrust ring in operative relation with said wedges, substantially as set forth.

2. In a wheel, the combination with a hub, of spokes having wedge engaging hasps at their inner ends; wedging means in said hub arranged to engage the inner ends of the spokes and draw them toward the wheel axis, comprising distinct wedges respectively engaging said hasps; a thrust ring in operative relation with said wedges; and bearings at each end of said wedges supporting them in opposition to the tensile strain thereon, substantially as set forth.

3. In a wheel, the combination with a hub, of spokes having wedge engaging recesses at their inner ends; of wedging means in said hub arranged to engage the inner ends of the spokes and draw them toward the wheel axis, comprising distinct wedges respectively engaging said recesses; and, a thrust ring in operative relation with said wedges, said wedges being carried by said ring, substantially as set forth.

4. In a wheel, the combination with a hub, of spokes having wedge engaging recesses at their inner ends; of wedging means in said hub arranged to engage the inner ends of the spokes and draw them toward the wheel axis, comprising distinct wedges respectively engaging said recesses; a thrust ring in operative relation with said wedges; and, a thrust sleeve in screw threaded engagement with said hub, arranged to adjust said wedges with respect to said spokes, substantially as set forth.

5. In a wheel, the combination with a hub, of spokes having wedge engaging recesses at their inner ends; of wedging means in said hub arranged to engage the inner ends of the spokes and draw them toward the wheel axis, comprising distinct wedges respectively engaging said recesses; a thrust ring in operative relation with said wedges; a thrust sleeve in screw threaded engagement with said hub, arranged to adjust said wedges with respect to said spokes; and, a clamping nut carried by said sleeve, arranged to clamp the spokes in adjusted position, substantially as set forth.

6. In a wheel, the combination with a hub, a felly, and spokes having wedge engaging recesses at their inner ends; of two circumferential series of wedges, in said hub, respectively engaging recesses in the inner ends of said spokes, from opposite sides thereof; and thrust rings respectively in operative relation with said two series of wedges, arranged to draw said spokes toward the wheel axis, substantially as set forth.

7. In a wheel comprising a hub, a felly, and spokes connecting them under tension, the combination with an axle box; of wedges in said box respectively engaged with recesses in the inner ends of said spokes; a thrust sleeve in screw threaded engagement with said box, arranged to adjust said wedges with respect to said spokes; a flange in rigid relation with said box engaging the inner ends of said spokes; a loose clamp ring on said box, engaging said spokes in opposition to said rigid flange; and, a clamping nut in screw threaded engagement with said thrust sleeve; arranged to clamp said ring against said spokes, substantially as set forth.

In testimony whereof, I have hereunto signed my name at Toledo, Ohio, this seventeenth day of October, 1906.

THOMAS H. WALBRIDGE.

Witnesses:
A. C. VAN DRIESEN,
A. VAN WONNER.